United States Patent [19]

Anghileri

[11] Patent Number: 4,986,432

[45] Date of Patent: Jan. 22, 1991

[54] BAKING-TIN ADAPTED TO COOK AND DISTRIBUTE SWEET THINGS SUCH AS SMALL CAKES, PUDDINGS AND THE LIKE, OR FOOD-STUFFS IN GENERAL

[75] Inventor: Gianmario Anghileri, Valmadrera, Italy

[73] Assignee: Novacart S.P.A., Valmadrera, Italy

[21] Appl. No.: 357,694

[22] Filed: May 26, 1989

Related U.S. Application Data

[63] Continuation of Ser. No. 23,576, Mar. 9, 1987, abandoned.

[30] Foreign Application Priority Data

Apr. 30, 1986 [IT] Italy ................. 21697/86[U]

[51] Int. Cl.$^5$ .................. B65D 1/30; B65D 21/02; A47G 19/00

[52] U.S. Cl. .................. 220/23.4; 206/820; 249/119

[58] Field of Search .............. 220/23.2, 23.4; 217/26.5; 206/504, 820; 249/117, 119, 120, 134

[56] References Cited

U.S. PATENT DOCUMENTS

| | | | |
|---|---|---|---|
| 1,476,910 | 12/1923 | Naugle | 220/23.2 |
| 1,544,389 | 6/1925 | Hall | 217/26.5 |
| 1,688,888 | 10/1928 | Spreen | 249/120 |
| 2,078,488 | 4/1937 | Farnham | 206/820 |
| 2,159,338 | 5/1939 | Murphy | 249/119 |
| 3,054,679 | 9/1962 | Bradford | 206/820 |
| 3,651,976 | 3/1972 | Chadbourne | 220/23.4 |
| 4,002,773 | 1/1977 | Entenmann | 206/45.19 |
| 4,314,650 | 2/1982 | Cillario | 220/23.4 |
| 4,371,327 | 2/1983 | Fevez | 249/119 |

FOREIGN PATENT DOCUMENTS

| 1000169 | 8/1965 | United Kingdom | 220/23.14 |
| 15219 | 0/1900 | United Kingdom | 220/23.2 |

*Primary Examiner*—George F. Lowrance
*Attorney, Agent, or Firm*—Darby & Darby

[57] ABSTRACT

A baking-tin to cook and distribute cakes and food-stuffs in general comprises a laminar support (2) made of paper material provided with a plurality of through holes (3) each of them housing a small pleated-paper cup (4). The support (2) is provided with a number of fracture lines (5) defining a plurality of support portions (6) thereon each circumscribed to at least a small cup 4), as well as a series of shaped holes (7) which are cut each at the crossing of two fracture lines (5). On the outer edges of the baking-tin (1) where the edge itself intersects the fracture lines, provision is made for a plurality of engagement seats (8) enabling the baking-tin to be engaged by grasping elements carried by the automated transport means. Each small cup can be engaged with the respective through hole (3) either by outbending and gluing its upper rim (4a) on the edge of the support defining the through hole, or by interposing the edge of the support between two consecutive folded parts (10) of a restrained fixing portion (9) provided on the upper rim (4aof said small cup.

1 Claim, 1 Drawing Sheet

BAKING-TIN ADAPTED TO COOK AND DISTRIBUTE SWEET THINGS SUCH AS SMALL CAKES, PUDDINGS AND THE LIKE, OR FOOD-STUFFS IN GENERAL

This is a continuation of application Ser. No. 023,576, filed Mar. 9, 1987.

BACKGROUND OF THE INVENTION

1. Field of the Invention

The present invention relates to a baking-tin to cook and distribute sweet things such as small cakes, puddings and the like (hereinafter referred to as cakes) or food-stuffs in general.

2. Prior Art

It is known that when cakes have to be cooked it is generally necessary to use baking-tins adapted to contain a certain amount of said cakes in order to allow the simultaneous introduction thereof into an oven and the simultaneous withdrawal therefrom.

For the purpose different types of baking-tins are currently used.

One of these types has a laminar metal structure and is provided with a number of niches, each of them designed to contain a cake. However baking-tins of this type involve high production costs as well as long times for the production of the cakes and, as a result, high costs due to a greater heat consumption. In fact in this case at the end of cooking it is necessary to withdraw the cakes from the respective niches and afterwards to pack them up in order to allow their distribution to retailers or consumers.

A further drawback of the above baking-tins is that they need a careful servicing as they must be periodically washed and sterilized. In addition said baking-tins cannot be used to cook cakes in modern microwave ovens, due to the undesired wave reflections they can generate inside the ovens themselves.

Baking-tins made of plastic material are also known but they are substantially identical, as to their construction concept, with the metal baking-tins previously described. In fact the only advantage they have is that their production costs are lower, while they are subjected to all the other drawbacks proper to metal baking-tins.

It is clear that under this situation the provision of baking-tins adapted to make it possible an important reduction in operations and times for the obtention of the finished product would be desirable.

In this connection the applicant has devised a particular type of cake container which has been the subject of the Italian Patent Application No. 23040B/82 filed in the name of the same applicant.

Such patent application relates to a cake container substantially consisting of a laminar support made of paper material into which by means of through holes a plurality of housings is created each of them accommodating a small pleated-paper cup substantially in the form of an upwardly open truncated cone or pyramid, designed to contain a cake.

Advantageously the containers of this type have proved to be adapted for use as baking-tins to cook cakes therein as well as to be directly wrapped up, at the end of baking, together with the cakes themselves in order to constitute a finished packed product.

By the use of these containers it is also possible to eliminate all other drawbacks mentioned above with reference to metal and plastic baking-tins.

In fact they have very reduced manufacture costs, do not need servicing as they are used only once, and do not give rise to any problems when used in microwave ovens.

However it was found that they are not adapted to be carried by automated transport systems interlocked to ovens and to packing devices of modern conception. In addition said containers only make it useful and convenient to introduce into the oven and to pack a given amount of cakes, predetermined at the moment of the manufacture thereof, since thay cannot be separated into pieces or portions adapted to contain a number of cakes different from the one mentioned above.

OBJECTS

The object of the present invention is to eliminate the above drawbacks by providing a baking-tin which, being conceptually based on the cake containers specified above, is also adapted to be carried by automatic transport means and to be easily divided into several portions.

A further object of the present invention is to provide a baking-tin of given sizes which even when divided into several portions one or more of said portions can be easily carried by the above mentioned automatic transport means.

SUMMARY OF THE INVENTION

The foregoing and still further objects that will become more apparent in the following are substantially attained by a baking-tin for cooking and distributing cakes and food-stuffs in general, of the type comprising a laminar support made of paper material provided with a plurality of through holes each of them housing a small pleated-paper cup, wherein said support has a number of fracture lines defining a plurality of support portions each of them circumscribing at least one of said small cups, as well as a series of shaped holes each of them obtained in the region where said fracture lines intersect each other, a plurality of engagement seats being provided on the outer edges of said baking-tin and exactly in the region of intersection between the edges themselves and said fracture lines, the configuration of said engagement seats corresponding to half a part of said shaped holes and said engagement seats being adapted to allow the baking-tin to be engaged by grasping elements carried by the automated transport means.

BRIEF DESCRIPTION OF THE DRAWINGS

Further features and advantages of the invention will become more apparent from the detailed description of a preferred but not exclusive embodiment of a baking-tin to cook and distribute cakes and foodstuffs in general according to the present invention, given hereinafter by way of non-limiting example with reference to the accompanying drawings, in which.

DESCRIPTION OF THE PREFERRED EMBODIMENTS

Figure 1:
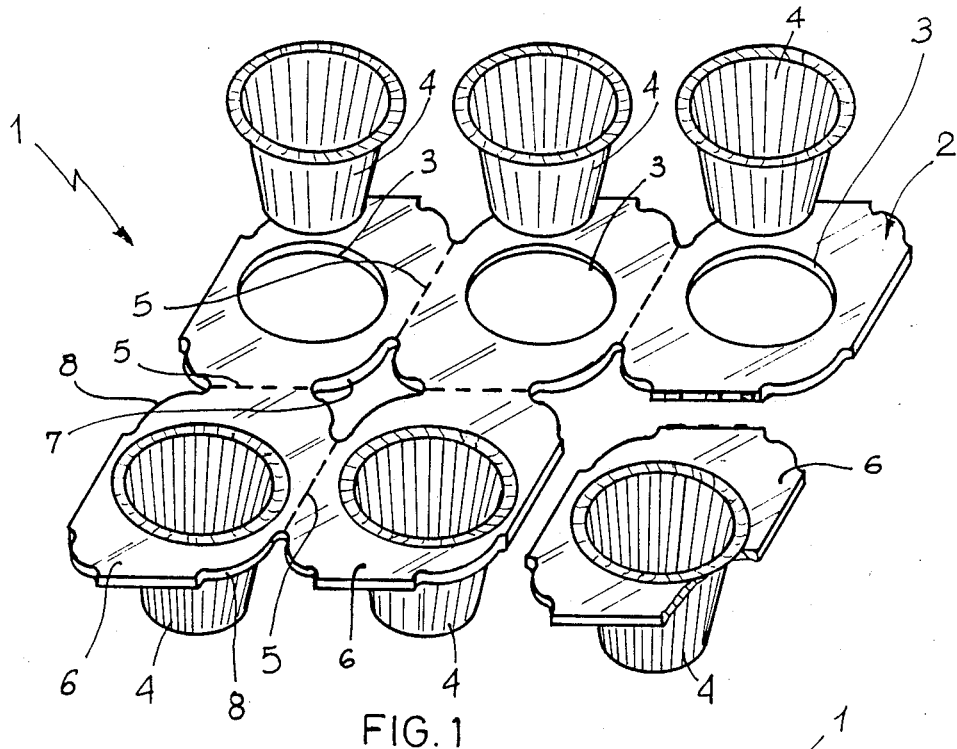
FIG. 1 is a perspective and partly exploded view of a baking-tin according to the present invention.

Referring to the drawings and particularly to FIG. 1, a baking-tin according to the invention has been globally identified by reference numeral 1.

The baking-tin 1 essentially comprises a support element 2 of laminar structure, made of paper material, into which a plurality of through holes 3 is cut, each of them adapted to engage a small pleated-paper cup 4. Each cup is designed to contain one cake or the like. Originally a number of fracture lines 5 is provided on the support element 2, which lines define, on the support element itself, a plurality of support portions 6, each of the latter circumscribing a small cup 4.

Furthermore, a shaped hole 7 is machined by means of a dinking die, at each crossing of two fracture lines 5.

Along the outer edges of the baking tin 1 provision is also made for a plurality of engagement seats 8 each of them being formed in the region where the outer edge itself intersects one of said fracture lines 5 and having a configuration similar to half a part of a shaped hole 7.

Said engagement seats are advantageously adapted to be engaged by grasping elements carried by automated transport means interlocked to the ovens or to packing devices known per se.

The presence of fracture lines on the support element 2 advantageously allows the baking-tin 1 to be divided into several portions each of them comprising any number of small cups 4 so that it may be possible to house the desired number of cakes.

By virtue of the fracture lines 5 it is also possible to separate a tin portion comprising a single small cup from the whole baking-tin as clearly shown by way of example in FIG. 1.

It is also advantageously provided, as it is possible to deduce from FIG. 1, that when the baking-tin 1 is divided into two or more portions along aligned fracture lines 5, the presence of the shaped holes 7 gives rise, on the outer edges of the tin portions thus obtained, to new engagement seats identical with the engagement seats mentioned above.

The present invention attains the intended purposes.

Figure 2:
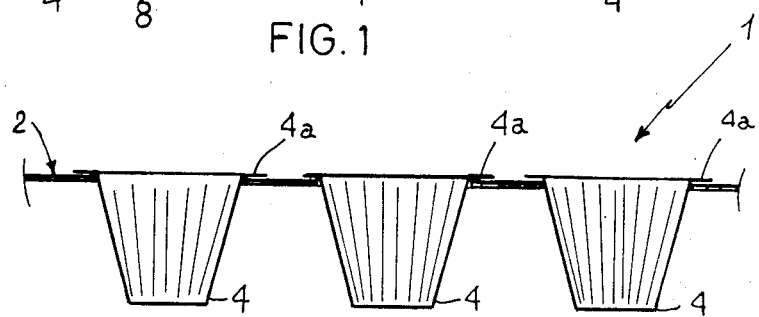
FIG. 2 shows the baking-tin seen in FIG. 1 sectioned along a transverse plane diametrically crossing the small cups according to one embodiment.
Figure 3:
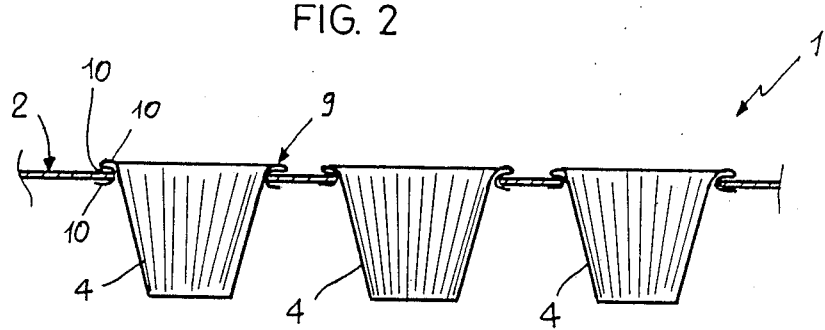
FIG. 3 is a cross-sectional view similar to FIG. 2 according to a second embodiment of the baking-tin of the invention.

In FIGS. 2 and 3 two different embodiments of the baking-tin 1 are shown; they lightly differ from each other as to the method used to join the small cups 4 to the support element 2.

In greater detail, in the embodiment of FIG. 2 each small cup 4 has its upper rim 4a outbent so that it lays on the edge of the support element 2 around the through hole 3 and is fastened thereto by means of glue.

In the second embodiment shown in FIG. 3 each small cup 4 is provided, on its upper rim, with a restrained fixing portion 9 obtained by a series of consecutive folded parts 10 extending circumferentially, substantially according to superposed horizontal planes. In this case the small cup 4 is fastened in a removable manner to the support element 2 in the region of the through hole 3 thereof due to the fact that the edge of said support element penetrates between two consecutive folds 10.

In this case it is therefore advantageously possible to separate the small cup 4 from the support element 2 so that the cake contained therein may be handled more easily. More particularly the small cup both for the packing step and the eating step can be easily removed from its housing in the support element. Afterwards, by exerting a pulling action on the small cup's outer rim the cake can be easily withdrawn and eaten.

Obviously many modifications and variations can be made to the present invention without departing from the inventive idea characterizing it.

What is claimed is:

1. A tin for baking, cooking and distributing of cakes and food in general, comprising a plurality of pleated-paper cups adapted to be directly introduced into and lay on an oven, each cup having a pleated top portion formed by a series of consecutive parts extending circumferentially and folded respectively outwardly, inwardly and further outwardly so as to define a peripheral groove between said inwardly folded and said further outwardly folded parts.

a laminar support made of paper material having a plurality of openings going through said support, each of said openings being dimensioned and shaped to receive one of said pleated-paper cups with the peripheral groove removably receiving a portion of the support in the vicinity of the openings, each of said cups being thereby easily removable from the tin by pushing the cups from the bottom thereof and each of said cakes being thereby easily removable from the cups by pulling the further outwardly folded part of the cups, said laminar support having a plurality of fracture lines defining a plurality of support portions, each of said support portion receiving and surrounding at least one said pleated-paper cup, a plurality of shaped holes being defined with the support at places where said fracture lines intersect each other; and a plurality of engagement seats provided along outer edges of said baking tin and within regions of intersection of said outer edges and said fracture lines, the configuration of the engaging seats corresponding to the configuration of a half of said shaped holes, said engagement seats being adapted for engagement with grasping elements carried by transporting means.

* * * * *